Aug. 27, 1929.                F. S. TRUSLER                1,726,130
                              ARTIFICIAL TOOTH
                            Filed March 30, 1928
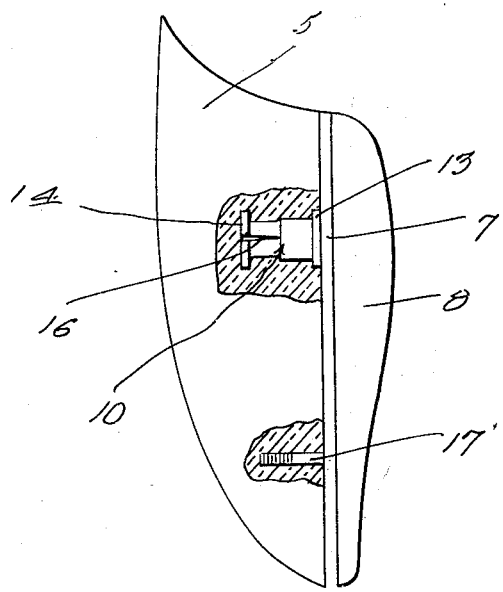
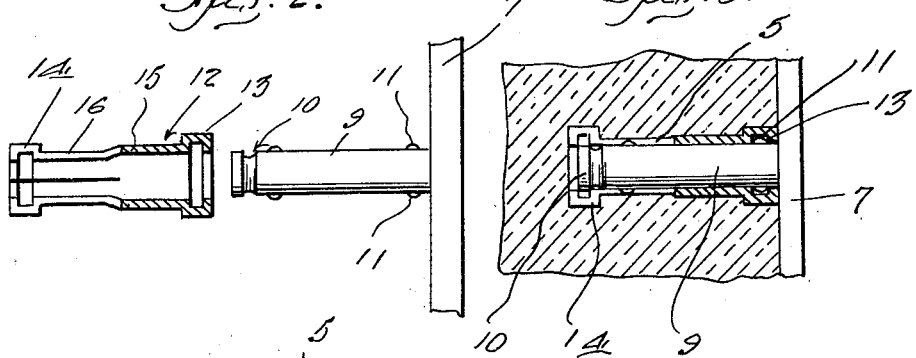
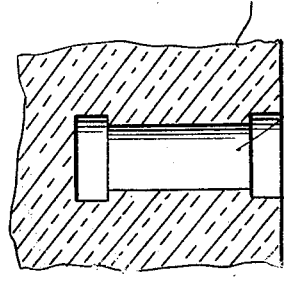
Inventor
F. S. Trusler
By  Clarence A. O'Brien
                    Attorney Patented Aug. 27, 1929.

1,726,130

UNITED STATES PATENT OFFICE.

FRANK S. TRUSLER, OF VERNON, TEXAS.

ARTIFICIAL TOOTH.

Application filed March 30, 1928. Serial No. 265,866.

This invention relates to an improved artificial tooth construction of the type embodying a metallic backing plate, a porcelain facing, and a separable connection between the backing plate and facing.

I am aware that numerous types of couplings and separable connections have been provided for releasably connecting a facing with a backing member. In fact, I have experimented with and used many of the structures now patented and marketed.

Having found certain defects in all of these devices with which I have come in contact, I have evolved and produced what I believe to be a more substantial and sturdy connection such as may be readily depended upon to hold the facing in place, even though subject to unusual strain, and yet permit it to be pryed off for replacement whenever necessary. The particular details and their relative arrangement and association, will become more readily apparent from the following description and drawings.

In the drawings:—

Figure 1 is a side elevation with portions broken away and shown in section, representing the special connection between the porcelain facing and the backing plate.

Fig. 2 is an enlarged view showing the improved separable coupling structure.

Fig. 3 is a view with the parts of the coupling connected together.

Fig. 4 is a fragmentary sectional view of a portion of the porcelain facing showing the special socket with which it is provided.

Referring to the drawings by numerals, it will be observed that 5 designates the porcelain facing which as shown in Fig. 4 is constructed in its inner face with one or more sockets 6. The opposite end portions of the socket are counter-bored and thereby enlarged in diameter as shown. The porcelain facing is in contact with the metallic backing plate 7 as shown in Fig. 1 this backing plate carrying the customary gold solder 8. Referring to Fig. 2, it will be seen that the backing plate carries an integral coupling pin 9 having a grooved head 10 and retention projections 11. This pin constitutes the male member of the improved coupling. The female member 12 is in the form of a tubular sleeve having an enlarged channel-shaped portion 13 at one end and a similar channel shaped portion at the opposite end. The portion 15 is of larger diameter than the remaining end portion, the last-named end portion being provided with longitudinal slits 16 forming a series of radially expansible spring tongues. In practice, the member 12 is cemented in the socket 6 with the portions 13 and 14 occupying the enlarged portion of the socket. Obviously, when the coupling 9 is inserted, the head 10 spreads the resilient fingers thereby expanding the split end of the tube and allowing the head to snap into retaining channels 14. This effects a firm connection or coupling between the facing and the backing plate. As before stated, either one or two of these couplings can be employed. The projections 11 are received in the end portions 13 as shown in Fig. 3. In addition, the backing plate is provided with a small pin 17 which fits into a small socket in the facing to prevent relative rotation of the facing and backing plate. It is to be understood that minor changes within the shape, and size of the invention may be resorted to if desired, without departing from the spirit and scope of the invention as claimed.

Having thus described my invention, what I claim as new is:—

1. An artificial tooth comprising a metallic backing plate and a porcelain facing having a socket, together with a separable coupling comprising a pin having a head at one end and provided with external projections, and a tubular coupling member having a channel-shaped end portion for cooperation with the head.

2. An artificial tooth comprising a metallic backing plate and a porcelain facing having a socket, together with a separable coupling comprising a pin having a head at one end and provided with external projections, and a tubular coupling member having a channel-shaped end portion for cooperation with the head, said tubular member being provided with longitudinal slits forming spring gripping fingers cooperable with the projections and headed end of said pin.

In testimony whereof I affix my signature.

FRANK S. TRUSLER.